US012646763B2

(12) United States Patent
Huang et al.

(10) Patent No.: US 12,646,763 B2
(45) Date of Patent: Jun. 2, 2026

(54) BATTERY MODULE

(71) Applicant: ASUSTEK COMPUTER INC., Taipei (TW)

(72) Inventors: Po-Ching Huang, Taipei (TW); Hui Wen Chiu, Taipei (TW); Chun-Wen Wang, Taipei (TW); Pao-Long Fan, Taipei (TW); Cheng-Ping Tsai, Taipei (TW); Ting-Jui Hu, Taipei (TW); Chao Chan Tan, Taipei (TW); Ming-Hung Yao, Taipei (TW); Chien-Chih Shih, Taipei (TW); Jui-Liang Ho, Taipei (TW); Ching-Kai Yu, Taipei (TW); Chih-Wei Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 692 days.

(21) Appl. No.: 18/171,991

(22) Filed: Feb. 21, 2023

(65) Prior Publication Data

US 2024/0039065 A1 Feb. 1, 2024

(30) Foreign Application Priority Data

Jul. 28, 2022 (TW) .................................. 111128244

(51) Int. Cl.
| | |
|---|---|
| *H01M 50/204* | (2021.01) |
| *H01M 10/48* | (2006.01) |
| *H01M 50/262* | (2021.01) |

(52) U.S. Cl.
CPC ....... *H01M 10/482* (2013.01); *H01M 50/204* (2021.01); *H01M 50/262* (2021.01); *H01M 2220/30* (2013.01)

(58) Field of Classification Search
CPC ............. H01M 10/482; H01M 50/262; H01M 50/204; H01M 2220/30
See application file for complete search history.

(56) References Cited

U.S. PATENT DOCUMENTS

| | | | | |
|---|---|---|---|---|
| 2016/0226037 A1* | 8/2016 | Yu | ........................ | H01M 50/262 |
| 2019/0393458 A1* | 12/2019 | Zeng | ................... | H01M 50/291 |
| 2020/0194744 A1* | 6/2020 | Wang | ................... | H01M 10/425 |

FOREIGN PATENT DOCUMENTS

| | | |
|---|---|---|
| CN | 104659305 B | 1/2017 |
| CN | 112736360 A | 4/2021 |

(Continued)

OTHER PUBLICATIONS

TWI762633 (Year: 2016).*

*Primary Examiner* — Alexander Usyatinsky
(74) *Attorney, Agent, or Firm* — Muncy, Geissler, Olds & Lowe, P.C.

(57) ABSTRACT

A battery module including a battery frame, a plurality of locking structures, a plurality of battery units, and a plurality of lug structures is provided. The battery frame is provided with an accommodating space. The battery frame includes a first portion extending along a first direction and a second portion extending along a second direction. The first direction is different from the second direction. The locking structures are disposed on the battery frame. At least one of the plurality of locking structures is disposed on an outer side of each of the first portion and the second portion. The battery units are disposed in the accommodating space. Each of the lug structures includes a lock portion configured to detachably engage with one of the locking structures.

9 Claims, 13 Drawing Sheets

100

(56) References Cited

FOREIGN PATENT DOCUMENTS

| TW | M294101 U | 7/2006 | |
| TW | I762633 B | 5/2022 | |
| WO | WO-2016020245 A1 * | 2/2016 | .......... H01M 10/613 |

* cited by examiner

100

BATTERY MODULE

CROSS-REFERENCE TO RELATED APPLICATION

This application claims the priority benefit of Taiwan Application Serial No. 111128244, filed on Jul. 28, 2022. The entirety of the above-mentioned patent application is hereby incorporated by reference herein and made a part of specification.

BACKGROUND OF THE INVENTION

Field of the Invention

The disclosure relates to a battery module, and in particular, to a battery module for a notebook computer.

Description of the Related Art

The battery modules of conventional notebook computers are specially designed. The design of the fixing structure on the battery frame is changed depending on the internal configurations of various computers, leading to numerous battery module specifications and high mold development costs.

BRIEF SUMMARY OF THE INVENTION

The disclosure provides a battery module. The battery module includes a battery frame, a plurality of locking structures, a plurality of battery units, and a plurality of lug structures. The battery frame includes an accommodating space. The battery frame includes a first portion extending along a first direction and a second portion extending along a second direction. The first direction is different from the second direction. A plurality of locking structures is disposed on the battery frame. At least one of the plurality of locking structures is disposed on an outer side of each of the first portion and the second portion. A plurality of battery units is disposed in the accommodating space. Each of the lug structures includes a lock portion configured to detachably engage with one of the locking structures.

According to the battery module provided in the disclosure, the lug structure is selectively mounted on a specific locking structure according to the required configuration, so as to meet the requirements of the internal configuration of different electronic devices without needing to modify the battery frame according to the internal configuration of the electronic device.

DETAILED DESCRIPTION OF THE EMBODIMENTS

Specific embodiments of the disclosure will be described in more detail below in combination with the accompanying drawings. The advantages and features of the disclosure become clearer based on the following description and the appended claims. It should be noted that the drawings are in a very simplified form and a non-precise scale, and are only intended to explain the objective of embodiments of the disclosure in a convenient and clear way.

Figure 1:
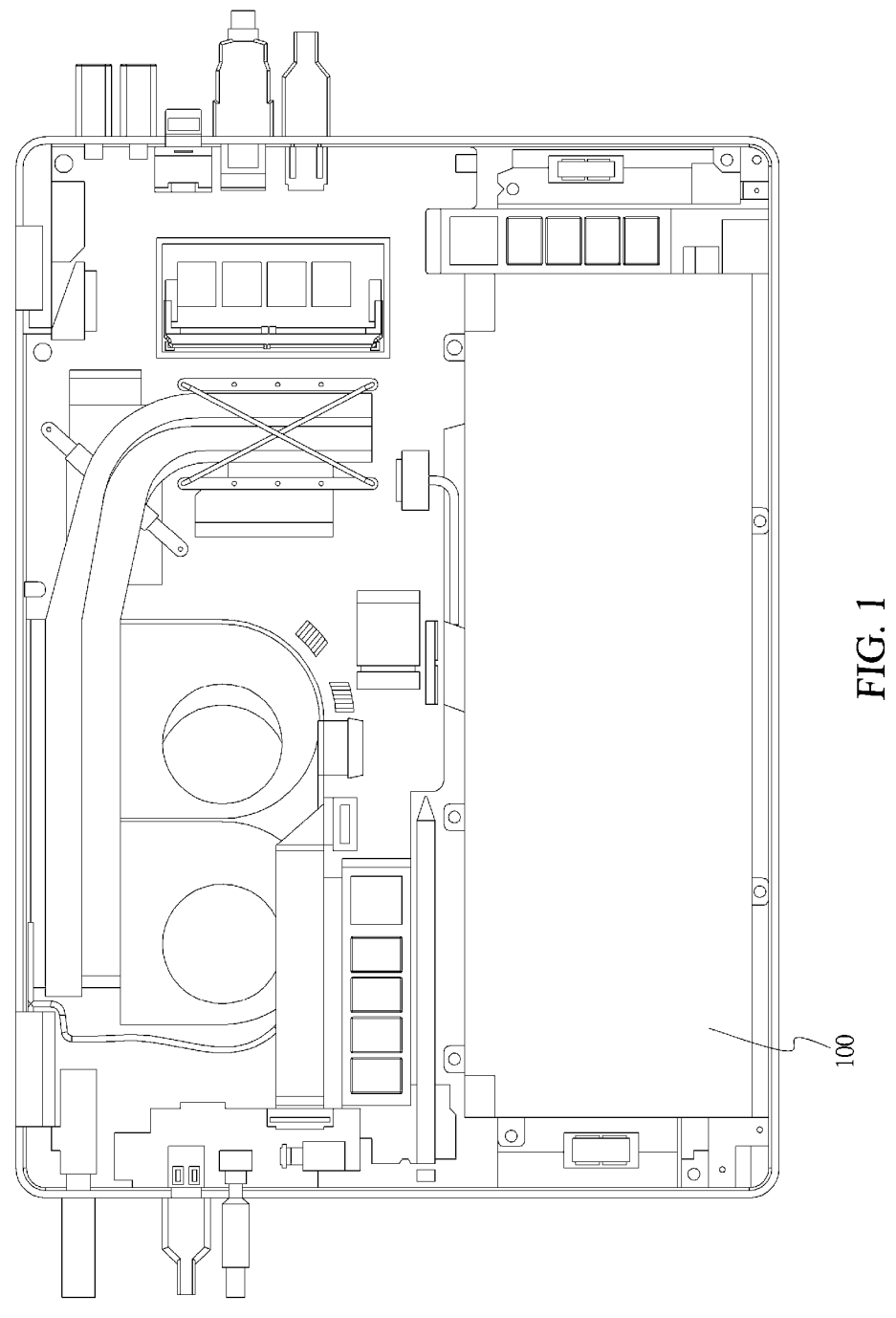
FIG. 1 is a schematic diagram of an internal structure of a notebook computer.
Figure 2:
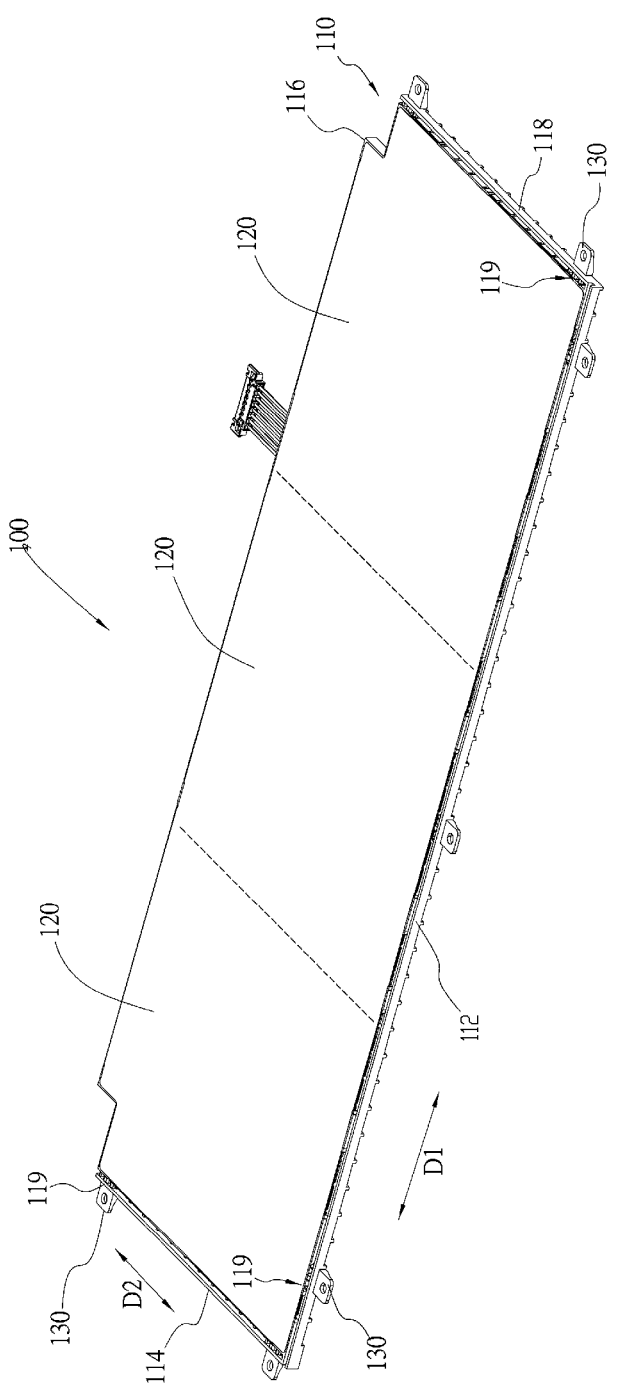
FIG. 2 is a schematic three-dimensional view of a battery module according to an embodiment of the disclosure.

Referring to FIG. 1 and FIG. 2, a battery module 100 provided in the disclosure is configured to be mounted in an electronic device, such as a notebook computer, to provide electric power required for the operation of the notebook computer.

The battery module 100 of the disclosure is of a flat structure, including a battery frame 110, a plurality of battery units 120, and a plurality of lug structures 130.

The battery units 120 are disposed in an accommodating space of the battery frame 110. The battery frame 110 includes a first portion 112 extending along a first direction D1 and a second portion 114 extending along a second direction D2. The first direction D1 is different from the second direction D2. In an embodiment, the first direction D1 is perpendicular to the second direction D2.

A plurality of locking structures 119 is disposed on the battery frame 110. At least one locking structure 119 is disposed on an outer side of each of the first portion 112 and the second portion 114. The lug structure 130 is configured to detachably engage with one of the locking structures 119.

In an embodiment, the battery frame 110 further includes a third portion 116 extending along the first direction D1 . At least one locking structure 119 is disposed on an outer side of the third portion 116. The battery frame 110 further includes a fourth portion 118 extending along the second direction D2. At least one locking structure 119 is disposed on an outer side of the fourth portion 118 (not shown, see the locking structure 119 located on the second portion 114).

The first portion 112, the second portion 114, the third portion 116, and the fourth portion 118 form a rectangular battery frame 110 to accommodate the battery units 120 (denoted by dashed lines in the figure). In some other embodiments, the battery frame 110 is L-shaped, trapezoidal, or of other shapes according to the requirements of the internal configuration of the notebook computer.

In an embodiment, the third portion 116 is divided into two frame bodies extending along the first direction D1 and the fourth portion 118 is divided into two frame bodies extending along the second direction D2, thus forming an L-shaped battery frame. In an embodiment, the third portion 116 is replaced with a frame body extending along a direction different from the first direction D1, thus forming a trapezoidal battery frame.

Figure 3A:
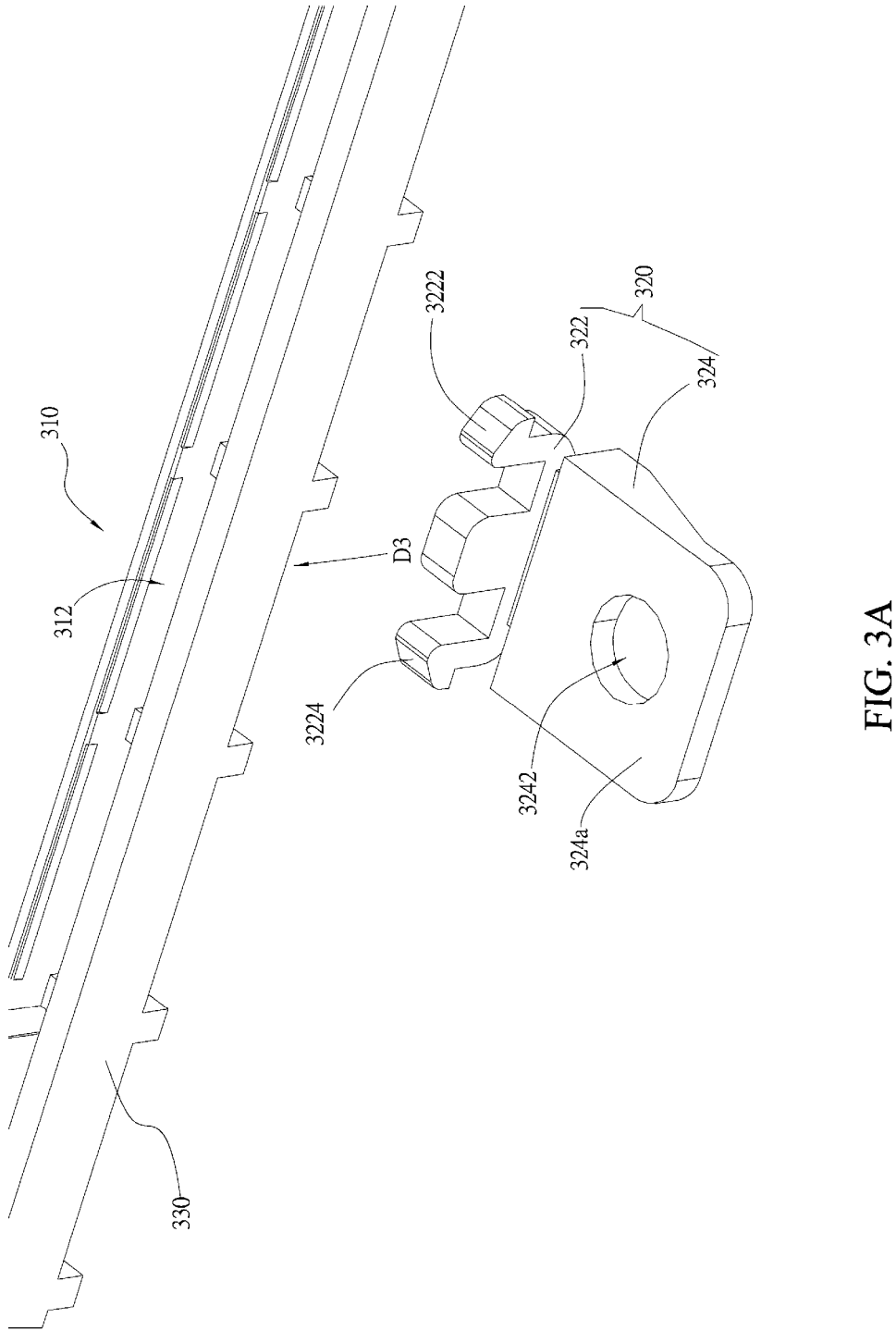
FIG. 3A and FIG. 3B are schematic enlarged diagrams of a locking structure and a corresponding lug structure according to a first embodiment of the disclosure.
Figure 3B:
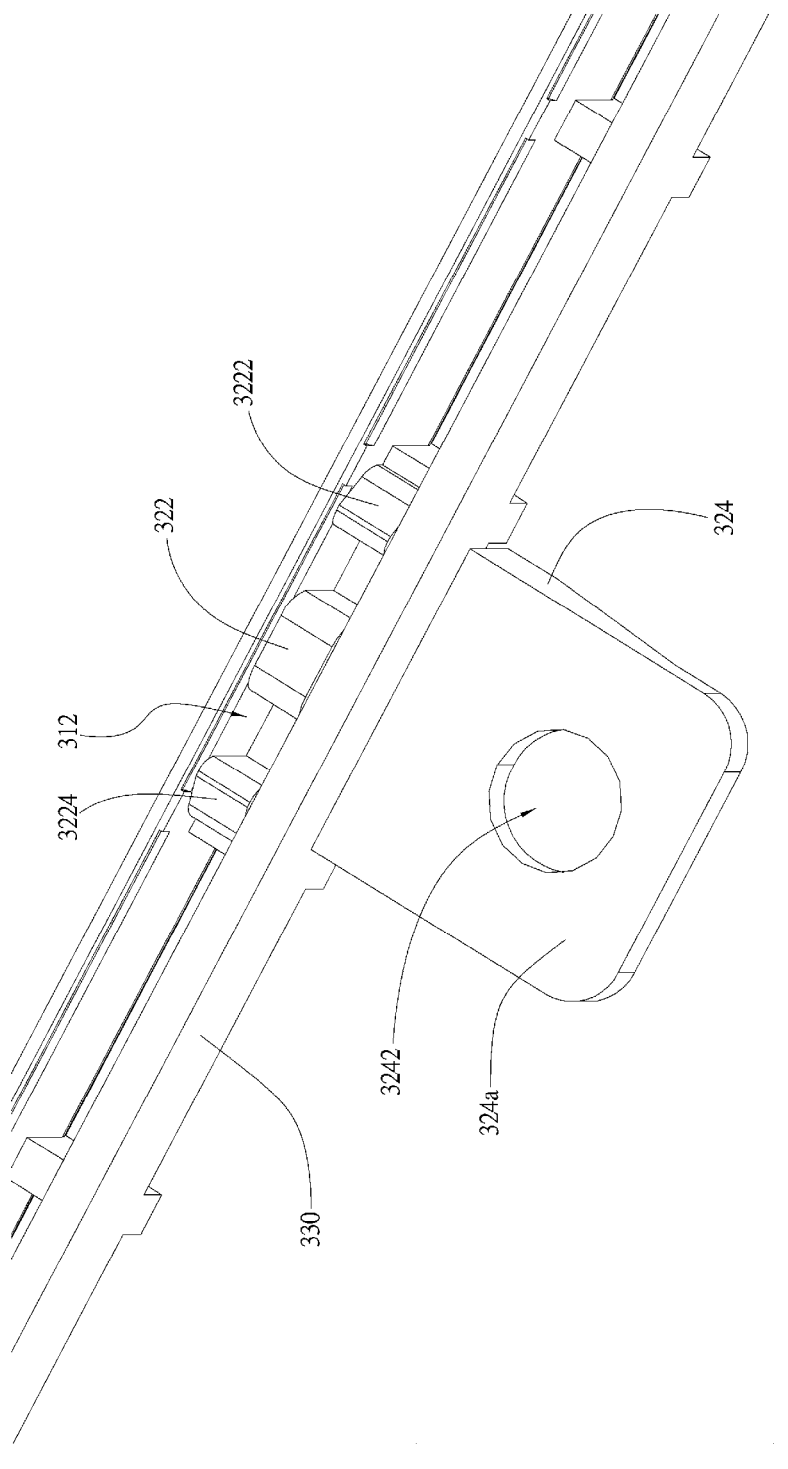

Referring to FIG. 3A and FIG. 3B, the locking structure 310 in this embodiment includes a hole 312. The hole 312 is vertically formed through the battery frame 330 from top to bottom.

The lug structure 320 includes a lock portion 322 and a fastening portion 324.

The lock portion 322 includes two hooks 3222 and 3224 configured to detachably engage with the hole 312 along a locking direction D3. The fastening portion 324 includes a fastening surface 324a. The fastening surface 324a is perpendicular to the locking direction D3. The fastening surface 324a is further includes a fastening hole 3242 configured for being fastened to a mechanical member in the notebook computer to fix the battery module.

The lock portion 322 in this embodiment includes two hooks 3222 and 3224 located on two opposing sides of the lock portion 322 to engage with the hole 312. In some other embodiments, the lock portion 322 includes a single hook to simplify the structure.

Figure 4A:
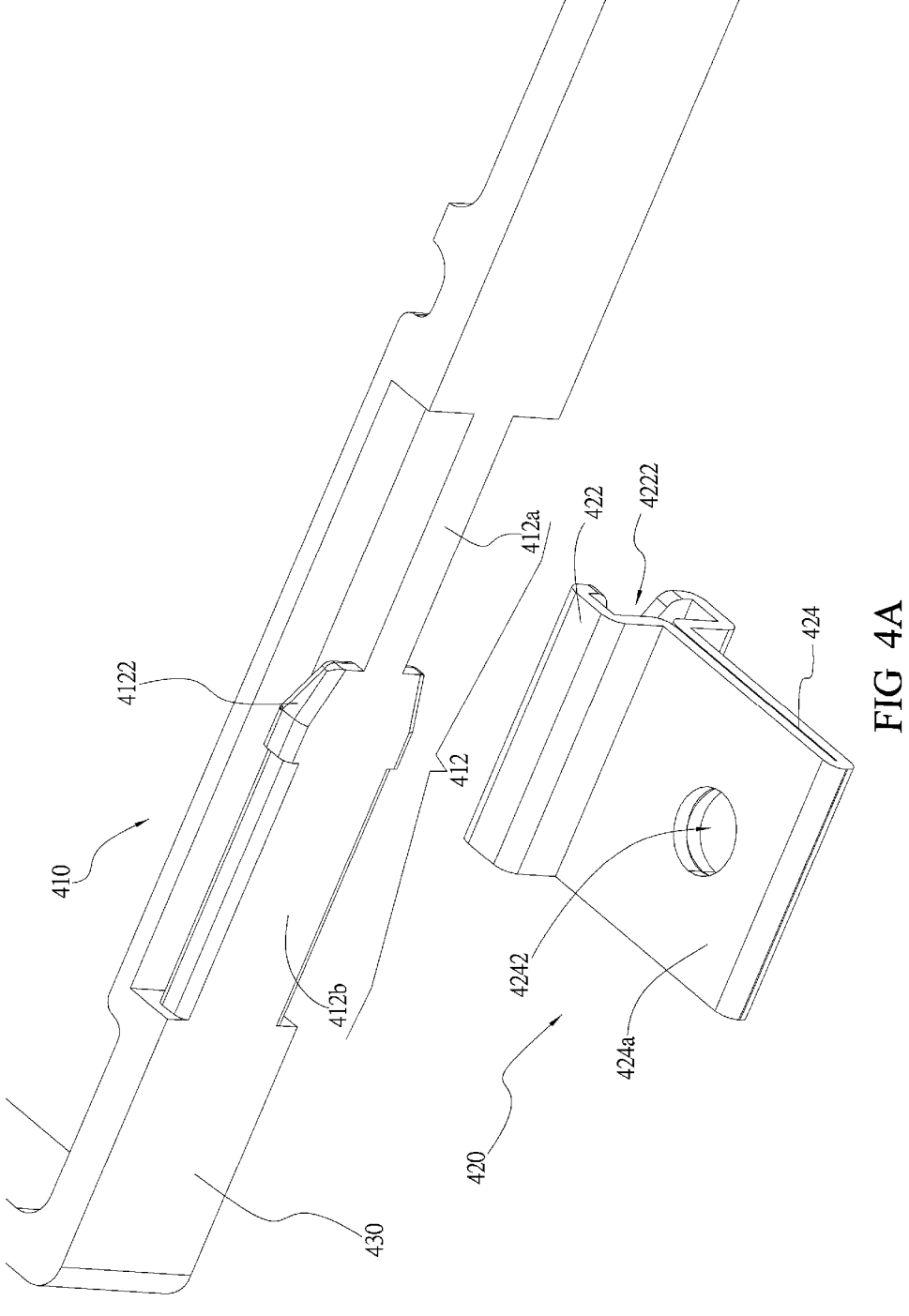
FIG. 4A and FIG. 4B are schematic enlarged diagrams of a locking structure and a corresponding lug structure according to a second embodiment of the disclosure.
Figure 4B:
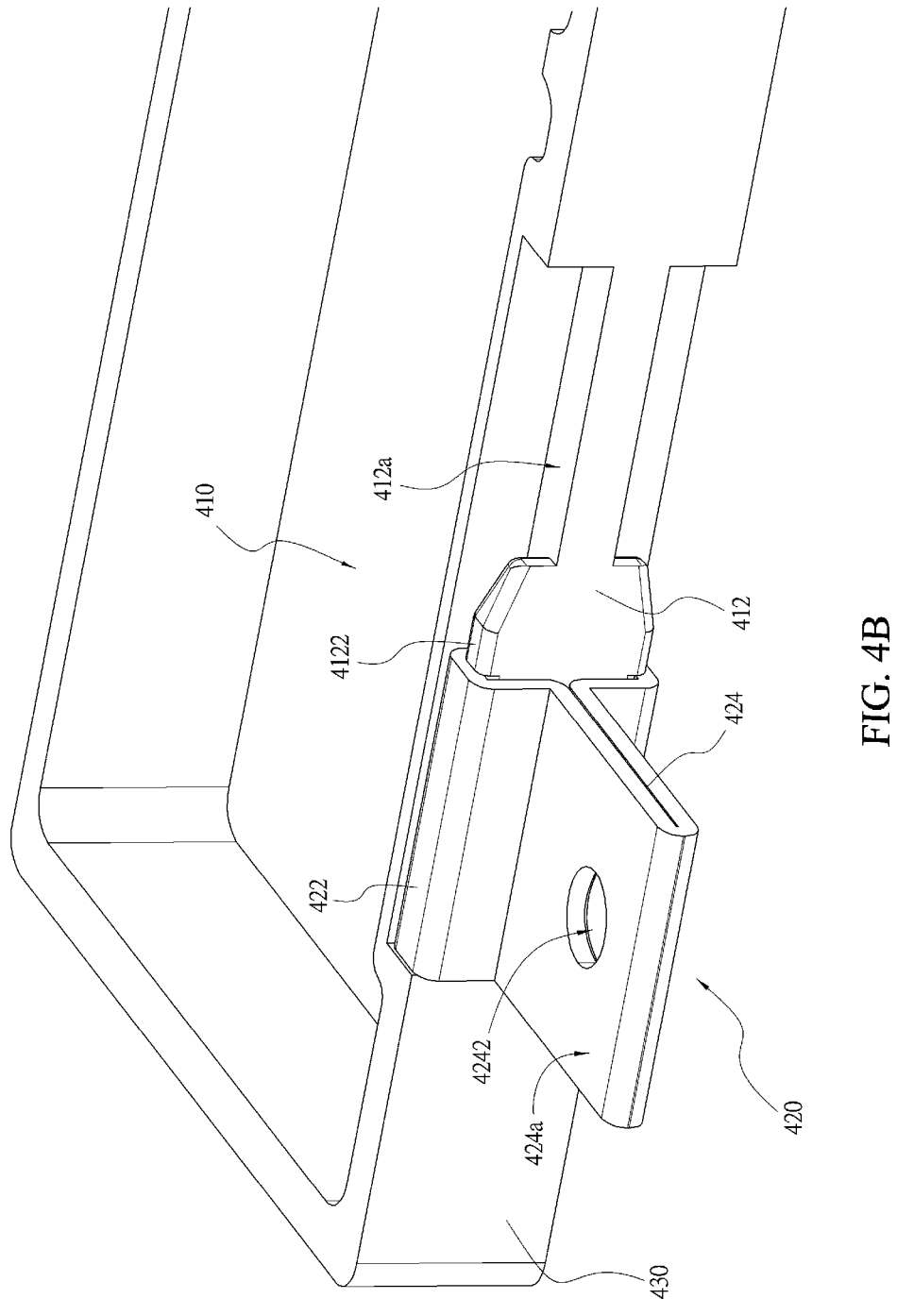

Referring to FIG. 4A and FIG. 4B, the locking structure 410 in this embodiment includes a rail 412. The rail 412 is formed on an outer side wall of the battery frame 430. An extending direction of the rail 412 is the same as an extending direction of the battery frame 430. The rail 412 includes a locking member 4122 dividing the rail 412 into a sliding region 412a and a positioning region 412b. A cross-sectional dimension of the rail in the positioning region 412b is greater than a cross-sectional dimension of the rail in the sliding region 412a. A dimension of the locking member 4122 is greater than the cross-sectional dimension of the rail in the positioning region 412b.

The lug structure 420 includes a lock portion 422 and a fastening portion 424. The lock portion 422 includes a slide groove 4222 configured to slidably fit to the sliding region 412a and engage with the positioning region 412b through the locking member 4122. The fastening portion 424 includes a fastening surface 424a. The fastening surface 424a includes a fastening hole 4242 configured for being fastened to a mechanical member in the notebook computer to fix the battery module.

Figure 5A:
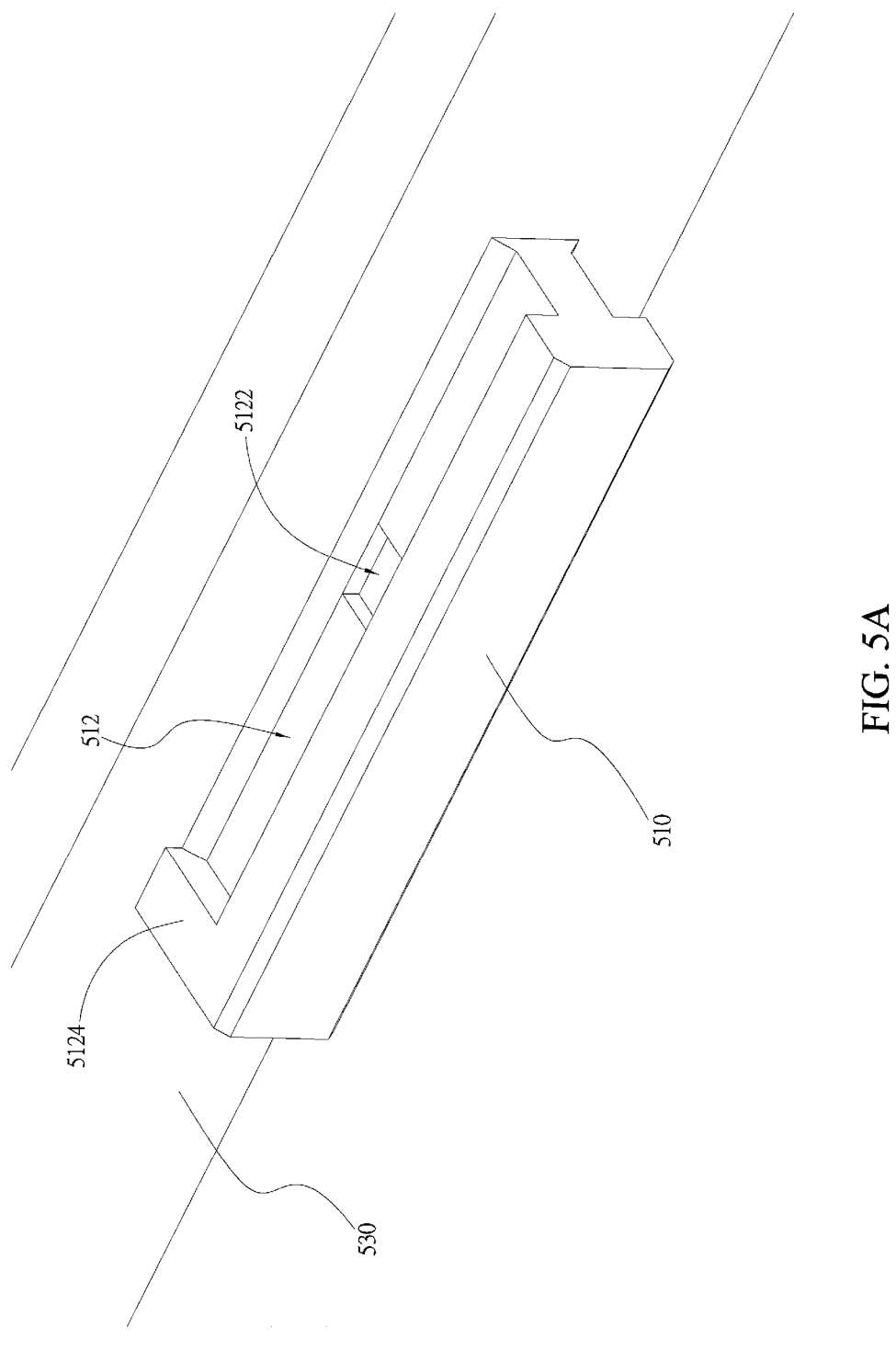
FIG. 5A to FIG. 5C are schematic enlarged diagrams of a locking structure and a corresponding lug structure according to a third embodiment of the disclosure.
Figure 5B:
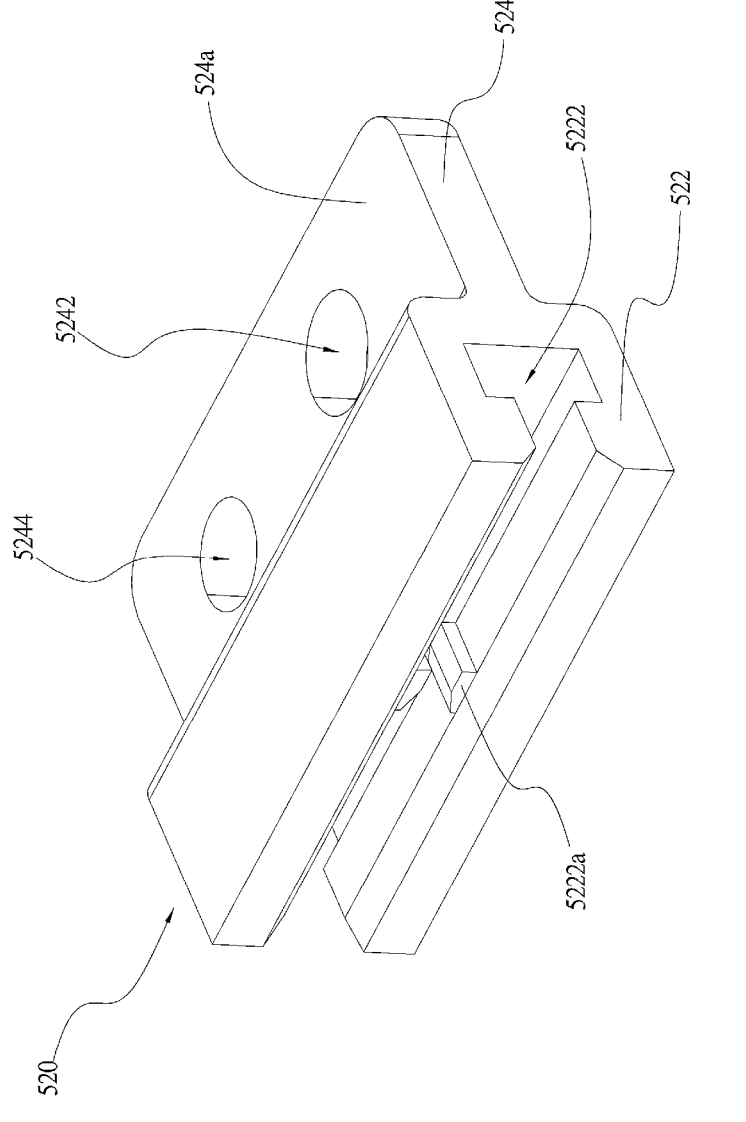
Figure 5C:
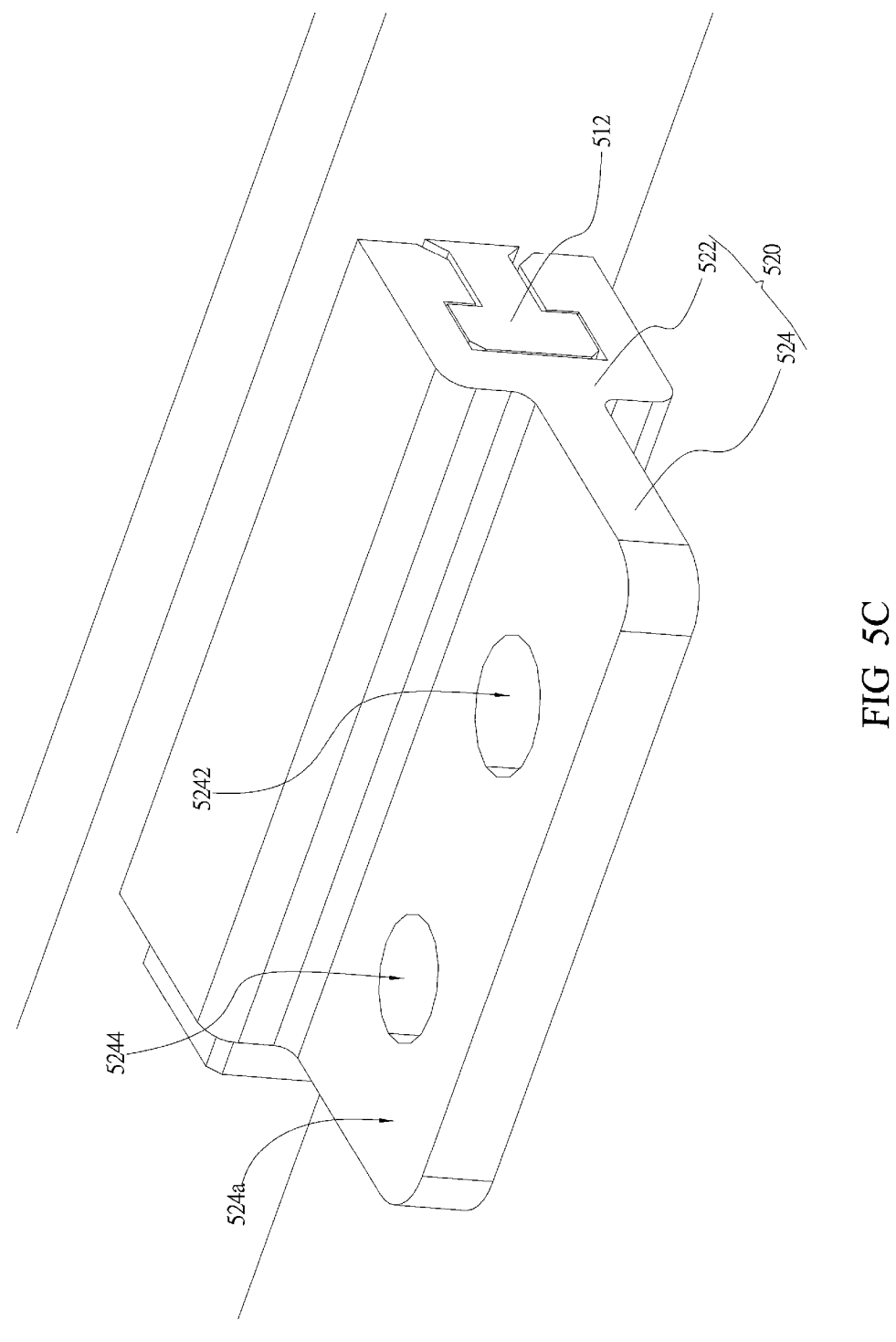

Referring to FIG. 5A to FIG. 5C, the locking structure 510 in this embodiment includes a rail 512. The rail 512 is formed on an outer side wall of the battery frame 530. An extending direction of the rail 512 is the same as an extending direction of the battery frame 530. The rail 512 includes a groove 5122. The groove 5122 serves as a locking member for fixing the lug structure 520. In an embodiment, a baffle 5124 is disposed at one end of the rail 512 to facilitate the mounting of the lug structure 520.

The lug structure 520 includes a lock portion 522 and a fastening portion 524. The lock portion 522 includes a slide groove 5222 configured to slidably fit to the rail 512. The slide groove 5222 is provided with a bump 5222a configured for engaging with the groove 5122, so as to fix the lug structure 520 to the locking structure 510. The fastening portion 524 includes a fastening surface 524a. The fastening surface 524a is in a horizontal direction.

The fastening surface 524a includes a fastening hole 5242 and a positioning hole 5244. The fastening hole 5242 is configured for being fastened to a mechanical member in the notebook computer to fix the battery module. The positioning hole 5244 is configured for determining whether the battery module is placed in position during fixing the battery module.

Figure 6A:
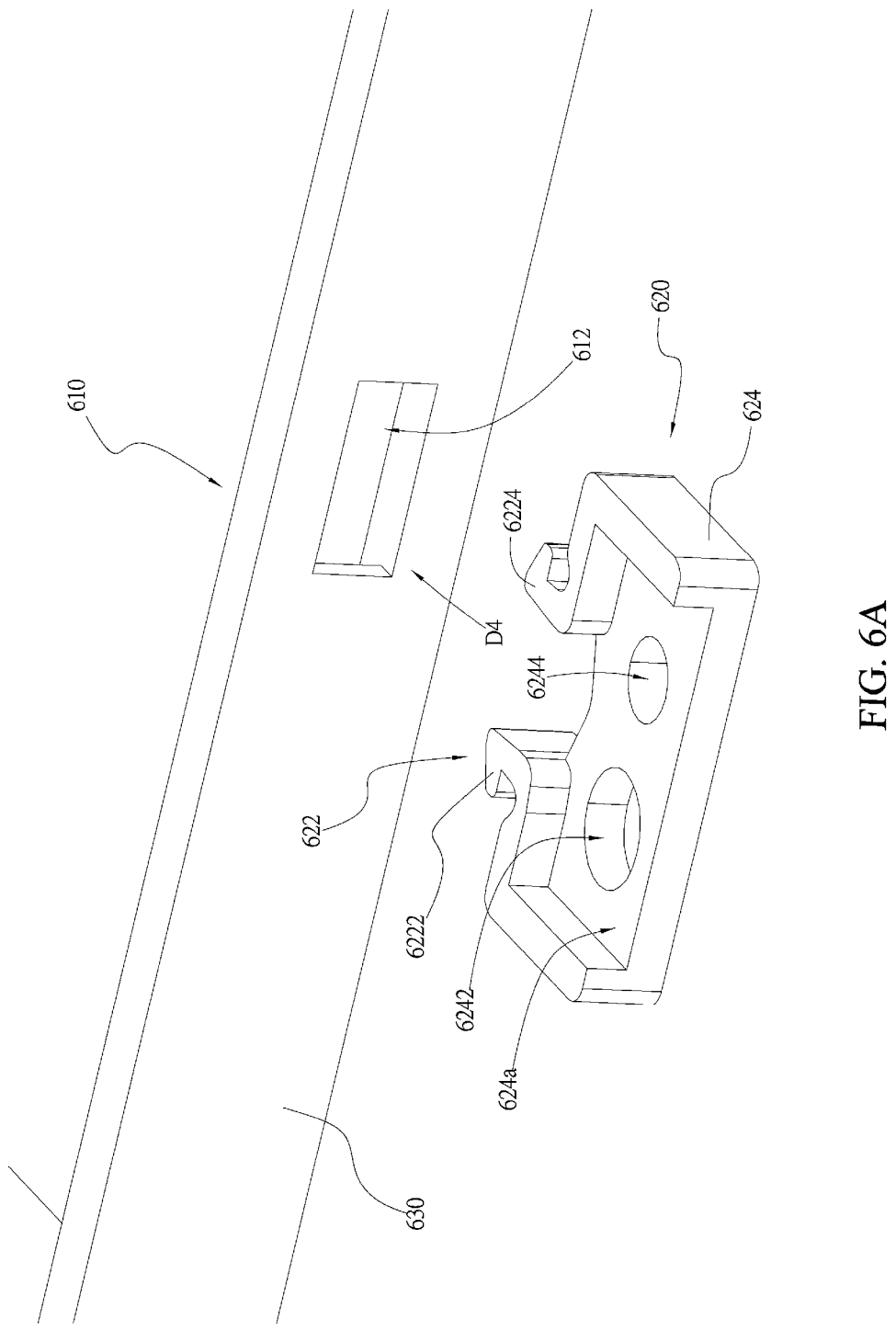
FIG. 6A and FIG. 6B are schematic enlarged diagrams of a locking structure and a corresponding lug structure according to a fourth embodiment of the disclosure.
Figure 6B:
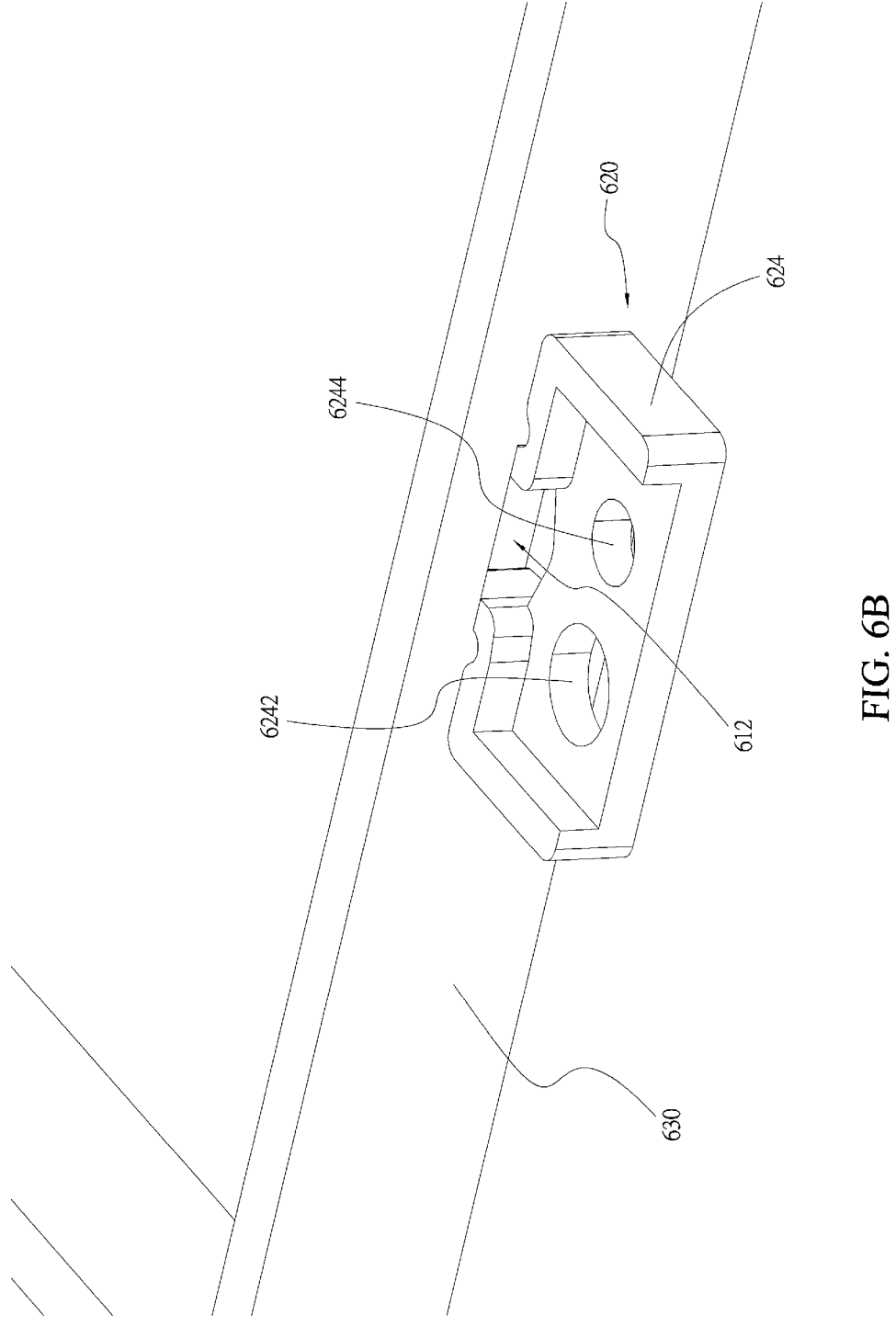

Referring to FIG. 6A and FIG. 6B, the locking structure 610 in this embodiment includes a hole 612. The hole 612 is transversely formed through the battery frame 630 from outside to inside.

The lug structure 620 includes a lock portion 622 and a fastening portion 624. The lock portion 622 includes two hooks 6222 and 6224 configured to detachably engage with the hole 612 along a locking direction D4.

The lock portion 622 in this embodiment includes two hooks 6222 and 6224 located on two opposing sides of the lock portion 622 to engage with the hole 612. In some other embodiments, the lock portion 622 includes a single hook to simplify the structure.

The fastening portion 624 includes a fastening surface 624a. The fastening surface 624a is parallel to the locking direction D4. The fastening surface 624a includes a fastening hole 6242 and a positioning hole 6244. The fastening hole 6242 is configured for being fastened to a mechanical member in the notebook computer to fix the battery module. The positioning hole 6244 is configured for determining whether the battery module is placed in position during fixing the battery module. In some other embodiments, the fastening portion 624 includes a plurality of fastening holes 6242 instead of one fastening hole 6242 and one positioning hole 6244, so as to provide the user with greater flexibility in use.

Figure 7A:
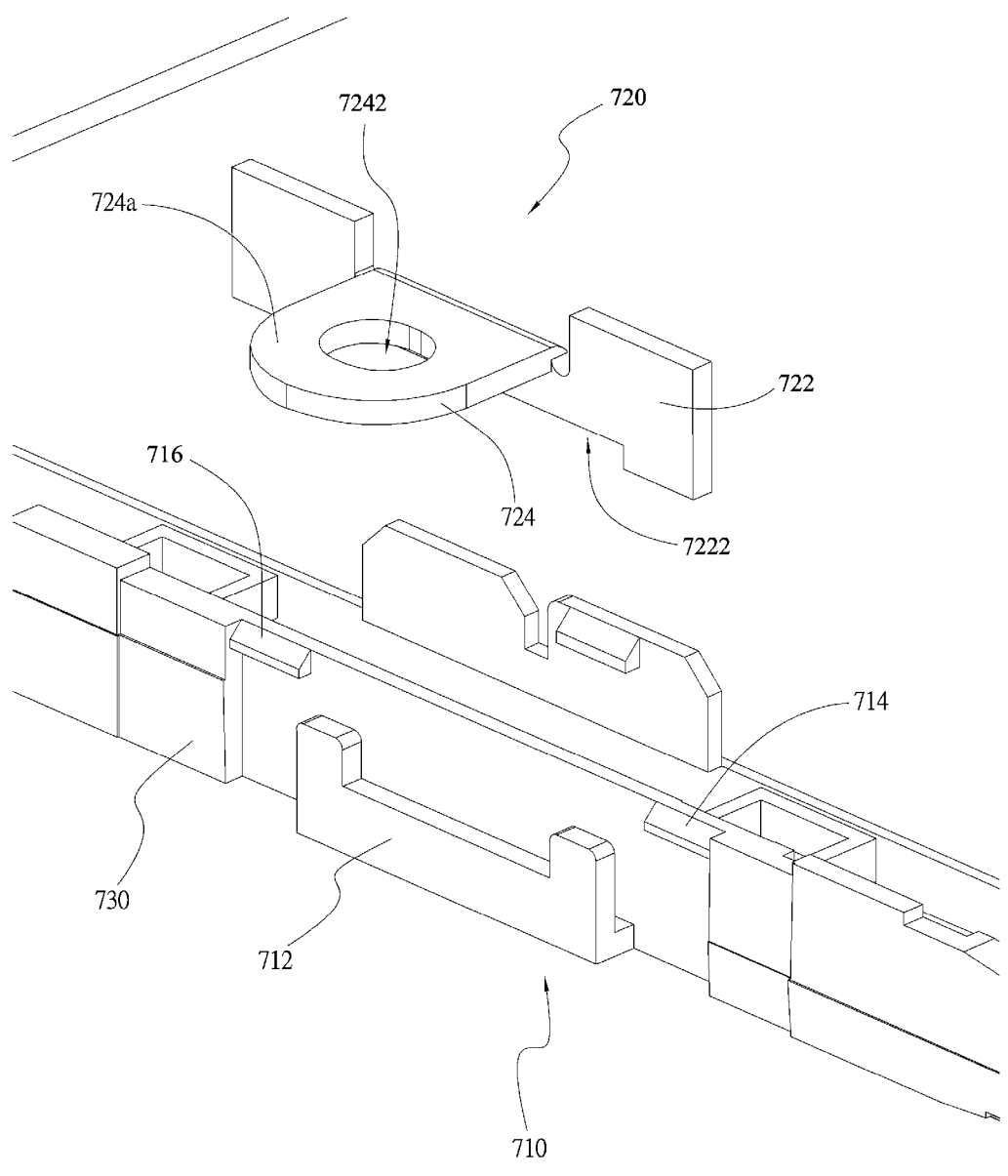
FIG. 7A and FIG. 7B are schematic enlarged diagrams of a locking structure and a corresponding lug structure according to a fifth embodiment of the disclosure.
Figure 7B:
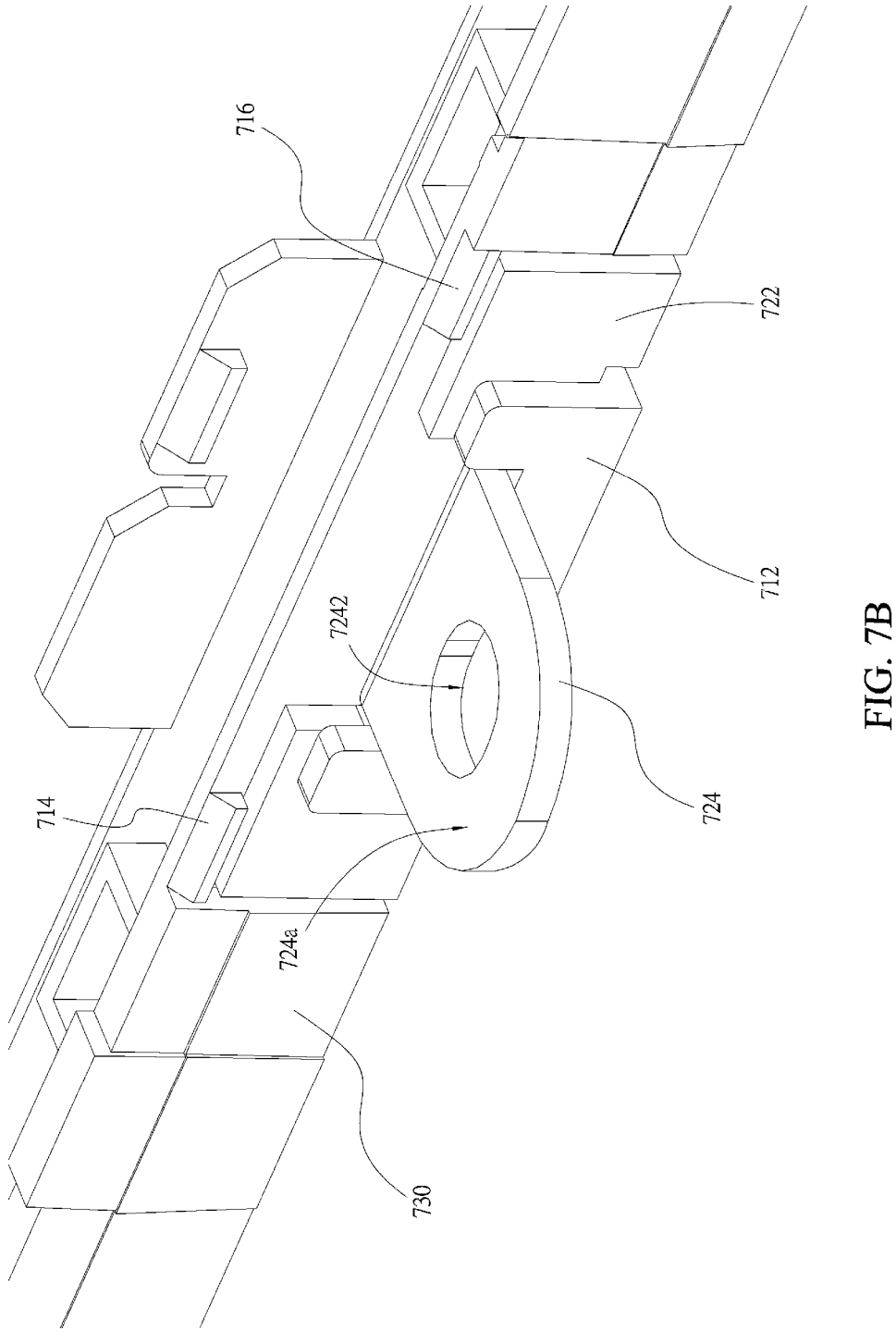

Referring to FIG. 7A and FIG. 7B, the locking structure 710 in this embodiment includes a hook 712 and two fixing clips 714 and 716. The hook 712 is disposed on an outer side of the battery frame 730 with an opening thereof facing upward. The fixing clips 714 and 716 are disposed on two sides of the hook 712 respectively to fasten to the lug structure 720. The lug structure 720 includes a lock portion 722 and a fastening portion 724.

The lock portion 722 includes a notch 7222. The notch 7222 faces downward to engage with the hook 712. When the notch 7222 is engaged with the hook 712, an upper edge of the lock portion 722 presses against the fixing clips 714 and 716, so as to fix the lug structure 720 to the hook 712. The fastening portion 724 includes a fastening surface 724a. The fastening surface 724a is perpendicular to the lock portion 722. The fastening surface 724a includes a fastening hole 7242 configured for being fastened to a mechanical member in the notebook computer to fix the battery module.

According to the battery module 100 provided in the disclosure, the lug structure 320, 420, 520, 620, 720 is selectively mounted on the locking structure 310, 410, 510, 610, 710 at the specific position according to the required configuration, so as to meet the requirements of the internal configuration of different electronic devices without needing to modify the battery frame 110 according to the internal configuration of the electronic device.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A battery module, comprising:
a battery frame, comprising a first portion extending along a first direction and a second portion extending along a second direction, wherein the first direction is different from the second direction;
a plurality of locking structures, disposed on the battery frame, wherein at least one of the plurality of locking structures is disposed on an outer side of each of the first portion and the second portion;
a plurality of battery units, disposed in the battery frame; and a plurality of lug structures, wherein each of the lug structures comprises a lock portion, and the lock portion is configured to detachably engage with one of the locking structures, wherein each of the lug structures further comprises a fastening portion, and the fastening portion comprises a fastening hole and a positioning hole, and wherein the fastening hole and the positioning hole are both round holes, and a size of the positioning hole is smaller than a size of the fastening hole.

2. The battery module according to claim 1, wherein the battery frame is rectangular or L-shaped.

3. The battery module according to claim 1, wherein the locking structure comprises a rail, a locking member is disposed on the rail, and the lock portion comprises a slide groove configured to slidably fit to the rail and engage with the locking member.

4. The battery module according to claim 1, wherein the locking structure comprises a hole, the lock portion comprises a hook, and the hook is configured to detachably engage with the hole.

5. The battery module according to claim 1, wherein the fastening portion further comprises a fastening surface, the lock portion comprises a locking direction, and the fastening surface is perpendicular to the locking direction.

6. The battery module according to claim 1, wherein the fastening portion comprises a fastening surface, the lock portion comprises a locking direction, and the fastening surface is parallel to the locking direction.

7. The battery module according to claim 1, wherein the first direction is perpendicular to the second direction.

8. The battery module according to claim 1, wherein the battery frame further comprises a third portion extending along the first direction, and at least one of the plurality of locking structures is disposed on an outer side of the third portion.

9. The battery module according to claim 1, wherein the battery frame further comprises a fourth portion extending along the second direction, and at least one of the plurality of locking structures is disposed on an outer side of the fourth portion.

* * * * *